United States Patent
Teken et al.

(10) Patent No.: US 10,245,784 B2
(45) Date of Patent: Apr. 2, 2019

(54) METHOD AND SYSTEM FOR REUSE OF MATERIALS IN ADDITIVE MANUFACTURING SYSTEMS

(71) Applicant: STRATASYS LTD., Rehovot (IL)

(72) Inventors: Avraham Teken, Gan Yavne (IL); Boris Belocon, Rehovot (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 15/632,593

(22) Filed: Jun. 26, 2017

(65) Prior Publication Data

US 2017/0320268 A1 Nov. 9, 2017

Related U.S. Application Data

(62) Division of application No. 13/995,954, filed as application No. PCT/IL2011/000960 on Dec. 21, 2011, now Pat. No. 9,688,020.

(60) Provisional application No. 61/425,279, filed on Dec. 21, 2010.

(51) Int. Cl.
| | |
|---|---|
| *B29C 64/209* | (2017.01) |
| *B33Y 30/00* | (2015.01) |
| *B33Y 10/00* | (2015.01) |
| *B29C 64/357* | (2017.01) |
| *B29C 64/106* | (2017.01) |
| *B29C 64/35* | (2017.01) |

(52) U.S. Cl.
CPC .......... *B29C 64/209* (2017.08); *B29C 64/106* (2017.08); *B29C 64/35* (2017.08); *B29C 64/357* (2017.08); *B33Y 10/00* (2014.12); *B33Y 30/00* (2014.12)

(58) Field of Classification Search
CPC .................................................. B29C 64/209
See application file for complete search history.

(56) References Cited

U.S. PATENT DOCUMENTS

| | | |
|---|---|---|
| 5,260,009 A | 11/1993 | Penn |
| 6,305,769 B1 | 10/2001 | Thayer et al. |
| 6,850,334 B1 | 2/2005 | Gothait |

(Continued)

FOREIGN PATENT DOCUMENTS

| | | |
|---|---|---|
| CN | 2900195 | 5/2007 |
| CN | 2010/00922 | 1/2008 |

(Continued)

OTHER PUBLICATIONS

International Search Report for International Application No. PCT/IL2011/000960 dated May 15, 2012.

*Primary Examiner* — Larry W Thrower
(74) *Attorney, Agent, or Firm* — Pearl Cohen Zedek Latzer Baratz LLP

(57) ABSTRACT

A printing system for forming three-dimensional objects, layer by layer is provided. The system includes inkjet printing heads, each printing head adapted to dispense one of a modeling material, a support material or a reusable waste material that comprises one or more materials that were previously discharged from at least one of the inkjet printing heads; a modeling material container; a support material container; a reusable waste material container and a leveling unit that removes surplus material from previously deposited layers, the surplus material being provided to the reusable waste container via a tube.

9 Claims, 3 Drawing Sheets

(56) References Cited

U.S. PATENT DOCUMENTS

| | | |
|---|---|---|
| 7,037,382 B2 | 5/2006 | Davidson et al. |
| 7,074,029 B2 | 7/2006 | Stockwell et al. |
| 7,500,846 B2 | 3/2009 | Eshed et al. |
| 7,648,664 B2 | 1/2010 | Teal et al. |
| 7,931,460 B2 | 4/2011 | Scott et al. |
| 2002/0079601 A1 | 6/2002 | Russell et al. |
| 2004/0012112 A1 | 1/2004 | Davidson et al. |
| 2004/0175451 A1 | 9/2004 | Maekawa et al. |
| 2005/0053798 A1 | 3/2005 | Maekawa et al. |
| 2005/0200039 A1 | 9/2005 | Nelsen et al. |
| 2007/0063366 A1 | 3/2007 | Cunningham et al. |
| 2008/0111271 A1 | 5/2008 | Khoshnevis |
| 2008/0211132 A1 | 9/2008 | Feenstra |
| 2008/0241404 A1* | 10/2008 | Allaman ............... B29C 64/165 427/333 |

FOREIGN PATENT DOCUMENTS

| | | |
|---|---|---|
| JP | 06 179243 | 2/1996 |
| JP | 2004 291625 | 10/2004 |
| JP | 2004 538191 | 12/2004 |
| JP | 2007 296854 | 11/2007 |
| WO | WO-03/028984 | 4/2003 |
| WO | WO 2008/146698 | 12/2008 |
| WO | WO-2009/139395 | 11/2009 |
| WO | WO 2010/083997 | 7/2010 |

\* cited by examiner

METHOD AND SYSTEM FOR REUSE OF MATERIALS IN ADDITIVE MANUFACTURING SYSTEMS

CROSS-REFERENCE TO RELATED APPLICATIONS

This application is a divisional application of U.S. Ser. No. 13/995,954, filed on Jun. 20, 2013 which will be issued as U.S. Pat. No. 9,688,020, which is a National Phase Application of PCT International Application No. PCT/IL2011/000960, International Filing Date Dec. 21, 2011, claiming priority of U.S. Provisional Patent Application No. 61/425,279, filed Dec. 21, 2010, all of which are hereby incorporated by reference.

BACKGROUND

In three-dimensional printing, building materials are selectively jetted from one or more printing heads or dispensers and deposited onto a fabrication tray in consecutive layers according to pre-determined image data. The layers may include cross sections of the three-dimensional object to be formed and of a support construction that is later removed from the finished object. The building materials may be UV polymerizable compositions, e.g. photopolymers, which are polymerized, solidified, conditioned or cured after deposition, for example, by ultraviolet (UV) radiation.

Prior to solidifying the layer, a leveling device may remove a surplus portion of the material dispensed in the layers. The collected surplus material is generally disposed of as waste inherent to the printing process.

It is common practice to perform a periodic maintenance process during the printing process, for example "purging" of the printing heads, e.g. once every 10 minutes, depending on the materials being used and other system characteristics. This procedure is intended to flush the printing heads and in this way reduce the risk of nozzles clogging. Nozzle clogging maybe the result of for example dust accumulation, remnants of solidified material that may accumulate within and/or around the nozzle orifices of the printing head, i.e. on the orifice plate, for example due to proximity of a UV light source and/or reflection of UV light. The printing head is moved to a purge unit where building material is provided to the nozzles and discharged from the nozzles so that material elements clogging the nozzle orifices and/or accumulating on the orifice plate may be removed together with the material used for the purging process. The purged material is collected and considered as waste, to be disposed of together with the waste collected from the leveling device.

It may not be desirable, e.g. for environmental reasons, to dispose of such waste by using standard methods as a sewerage system or a municipal waste removal service, and laws or regulations may prohibit this as well. Instead, the waste material for disposal should be pre-treated and/or fully cured and safely disposed of.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
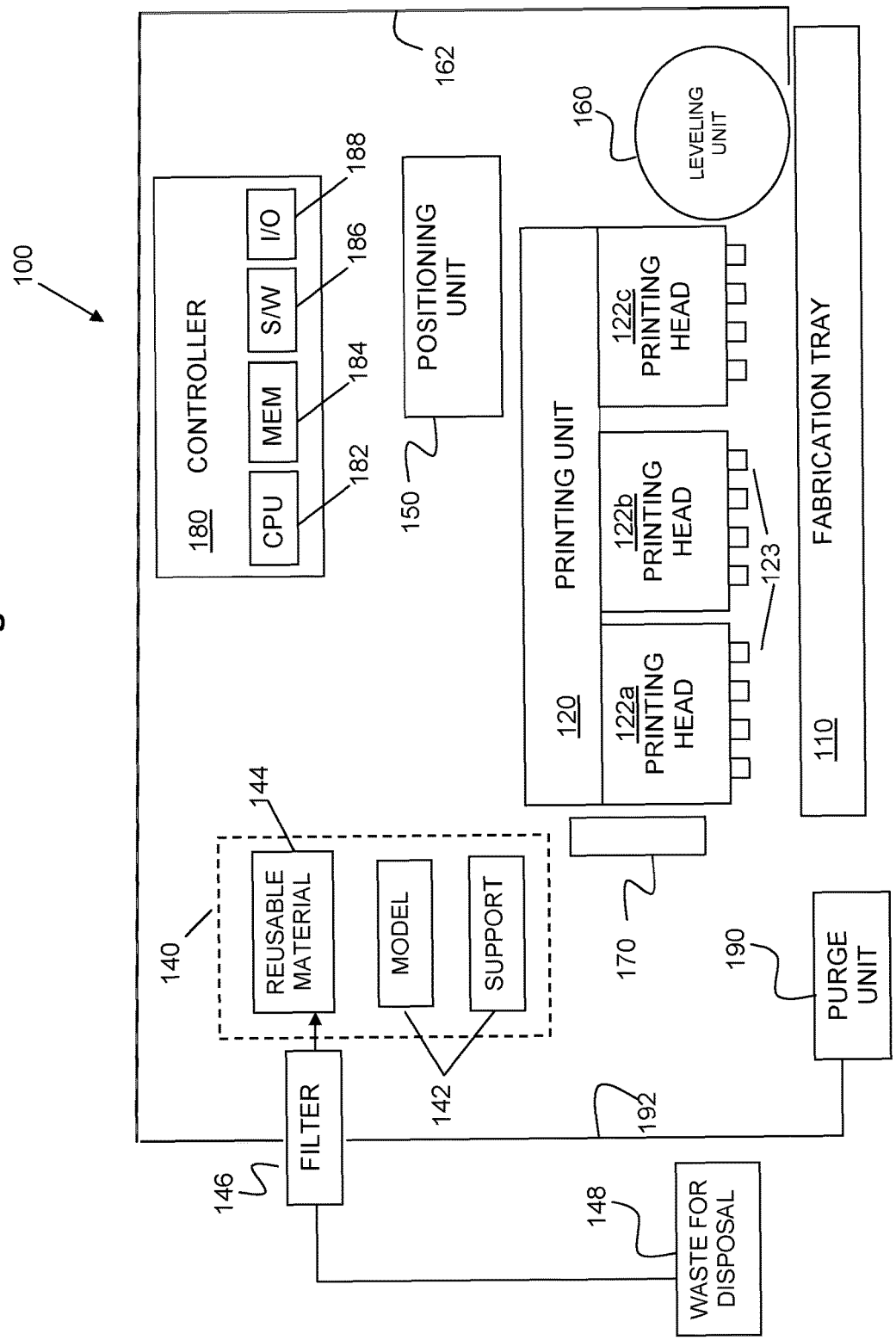
FIG. 1 is a schematic illustration of an exemplary 3D printing system according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, components and circuits may not have been described in detail so as not to obscure the present invention.

The terms "layer" and "object layer" are used throughout the specification and claims to describe any lamina or film that may represent a cross-section or slice of a three-dimensional (3D) object. A layer may be formed and adhere to previously formed and adhered layers in a "layer by layer" fashion to create, build up or form the 3D object.

The terms "X direction" and "Y direction" as used throughout the specification and claims refer to directions horizontally parallel to a fabrication tray that are indicative of relative movement between a dispensing head (printing head) or a printing assembly and the fabrication tray during selective dispensing of material from nozzles of the dispensing head onto the fabrication tray. The relative movement may be achieved by moving the dispensing head while the tray is kept motionless, by moving the fabrication tray while keeping the dispensing head motionless or by moving both the printing head and the fabrication tray relative to one another. The X direction may be the scanning direction while the Y direction may be the indexing direction. The term "Z direction" as used herein throughout the specification and claims refers to a direction perpendicular to both the X and Y directions. The Z direction is indicative of the vertical direction in which the consecutive layers are formed.

The terms "dispensing head", "printing head" or "head" as used herein are interchangeable and refer to printing heads each having one or more nozzles, e.g. an array of nozzles for dispensing, i.e. depositing droplets of liquid building materials in layers onto a fabrication tray to or onto the surface of previously printed layers of the 3D object being formed.

It is noted that the term "building material" as used herein may include model or "modeling" material, support or "supporting" material, and/or any suitable combination of modeling material and/or supporting material, used in the building, forming, modeling, printing or other construction of three-dimensional (3D) objects or models. Building material may include modeling material used to create models, material used to modify such material (e.g., dyes, fillers, etc), support material, or other material used in the creation of objects, whether or not appearing in the final object. The building materials may be ultraviolet polymerizable liquid or gel materials e.g. photopolymer materials, which solidify or become solid or gel-like upon curing. Examples of modeling and support materials are Objet® FullCure®720 RGD720, FullCure®705, respectively, both provided by Objet Ltd., Rehovot, Israel. It should be understood, however, by those skilled in the art that embodiments of the invention are not limited to building materials that are liquid at room temperature. According to some embodiments the building materials may be solid or semi solid at room temperature and may be heated to become liquid to enable transfer via tubes or pipes to dispensing heads for deposition.

Embodiments of the present invention are directed to a system and method for reusing waste material generated by an Additive Manufacturing (AM) apparatus in the process of producing three-dimensional (3D) objects. Although embodiments of the invention will be described for ease of explanation with respect to selective deposition modeling (SDM), solid freeform fabrication (SFF) or 3D printing, it should be realized that the invention is not limited to such systems and may be utilized in other AM systems.

According to embodiments of the invention, the method nay include generating image data that includes cross sectional layers of a three-dimensional object to be printed and of a support construction and selectively dispensing, layer by layer, according to the image data building materials and reusable material from different dispensing heads, wherein the reusable material includes surplus material collected to be reused during formation of the three-dimensional object.

According to embodiments of the present invention, surplus material is removed from layers deposited in the process of manufacturing a 3-dimensional (3D) object. The surplus material, instead of being disposed of as waste material, is transferred back to the printing system to be deposited in subsequent printing layers. This surplus (i.e. waste) material may be deposited within the boundaries of a cross section of the 3-dimensional object to become part of the 3D object or outside the boundaries of the 3D object cross section as part of a support construction, which is subsequently removed from the finished product.

The surplus material i.e. waste material removed from the deposited layer/s may include a mixture of two or more compositions, for example one or more modeling material compositions mainly used for producing the 3D object or model and support material compositions mainly used for forming the support construction. The surplus material may include un-polymerized liquid components, as well as partly-polymerized or gel-like components and polymerized solid particles which may not be suitable for reuse. According to embodiments of the invention, the surplus material is filtered to remove polymerized solid particles, prior to being delivered to a liquid surplus material container and/or dispenser for reuse in printing, in the case of useable liquid surplus material, or to a waste container for disposal, in the case of polymerized material.

In some embodiments, building materials that are discharged or purged from the nozzles during maintenance of the printing head nozzle orifice plate are collected in a purge unit. Likewise, surplus or waste material thus collected many include un-polymerized liquid material as well as partly-polymerized, gel-like or polymerized solid material elements, and likewise be filtered before being delivered either to a liquid surplus material container and/or dispenser for reuse, or a waste container that collects polymerized waste material for disposal. Throughout the specification and claims the term "surplus material" is used to describe both material collected from the deposited layers and material collected in the purging operation.

Some embodiments of the invention are directed to a method of disposing of waste material generated by an additive manufacturing (AM) system where at least a portion of the surplus material removed from deposited layers and/or material discharged during purging and not intended for reuse may be deposited and cured layer by layer to form a waste block, concurrently with printing the layers of the 3D dimensional object. The cured waste block may be then disposed of in an environmentally safe manner. In other embodiments, substantially the entire surplus material is recycled and reused as a building material.

Reference is now made to FIG. 1, which is a schematic illustration of an exemplary three-dimensional (3D) printing system according to embodiments of the invention. A three-dimensional dispensing or printing system 100 may include a fabrication platform or tray 110, a printing unit 120 having one or more printing heads 122a, 122b, 122c, and a material supply unit or system 140. Material supply unit 140 may include two or more primary or new material containers or cartridges 142 and one or more reusable material containers 144. Reusable material container/s 144 may be a container dedicated to collection and supply of surplus material for dispensing which may comprise part of the printing system and/or material supply unit, i.e. internal to the printing and/or material supply system, or be separate from, e.g. external to the printing and/or the material supply system.

System 100 may further include a positioning or conveyance unit 150, a leveling device 160, one or more curing units or radiation sources 170, a controller 180 and a purge unit 190. Leveling unit 160 may be in a form of a roller. The roller may level and/or establish a predetermined thickness of a deposited layer by collecting surplus material deposited during a pass of the printing heads over the fabrication tray. Surplus material may be removed from the roller e.g. by a blade or other method and collected in a bath (not shown). The surplus material thus removed is then conveyed via tube 162 to filter 146 where the surplus material is filtered to remove solidified particles and the filtered liquid is transferred to reusable material container 144 for reuse. Solidified waste material is transferred to a waste disposal container 148 for disposal. Alternatively or additionally the filter may be located between container 144 and printing unit 120.

Purge unit 190 may comprise a bath (not shown) from which building materials discharged from the printing head/s during maintenance of the printing head/s orifice plate/s are conveyed via tube 192 to filter 146 where the surplus material is filtered to remove solidified particles and the filtered liquid transferred to reusable material container 14 for reuse and solidified particles are transferred to waste disposal container 148 for disposal. The purge operation may be performed for nozzles that were previously used to print modeling material using the same modeling material.

Likewise, the purge operation may be performed for nozzles that were previously used to print support material using the same modeling material. The purge operation may further be performed for nozzles that were previously used to print reusable material using the reusable or recycled material. The purged materials, as aforesaid, may be collected and filtered, and transported to the same reusable waste container 144 or to a separate reusable material container for reuse.

In one embodiment of the invention, purged materials may be collected and filtered separately according to their type and intended use. For example, purged modeling material may be reused for printing of the 3D object and optionally part of the support construction, purged support material may be reused in printing support constructions, and purged material may be reused for parts of the model or support constructions.

Radiation source 170 may be a UV light source, however it should be appreciated that embodiments employing other radiation sources or curing units, such as infrared units are also included within the scope of the invention. It will be appreciated, however, by those skilled in the art that in other embodiments of the invention, light of any other suitable spectrum may be used.

The curing may be carried out after the deposition of each layer or after the deposition of more than one layer. Although in the exemplary embodiment of FIG. 1, a single radiation unit is illustrated, it should be understood to a person skilled in art that the invention is not limited in this respect and according to embodiments of the present invention any suitable number of radiation units may be used.

Printing unit 120 may be, for example, an ink jet unit or dispenser having one or more dispensing units (dispensers), for example, ink jet printing heads 122a, 122b, 122c. Each printing head may include a plurality of dispensing nozzles 123 arranged in an array of one or more rows along the longitudinal axis of the printing head. Material containers 142 may supply building materials to the printing heads, a different building material for each printing head. For example modeling material may be supplied to printing head 122a and support material may be supplied to printing head 122c. In an embodiment of the present invention, reusable material may be supplied to a separate printing head, e.g. printing head 122b. In some embodiments, two different modeling materials may be deposited and thus one modeling material may be supplied to printing head 122a and another modeling material supplied to printing head 122b, while support material is supplied to printing head 122c. Reusable material can thus be supplied to printing head 122b instead of a second modeling material, or be supplied to an additional separate printing head (not shown) when a second modeling material is supplied to printing head 122b.

Printing unit 120 may be coupled to positioning unit 150 to enable movement of the printing unit over fabrication tray 110 and/or the object/s in process of being printed on the fabrication tray in both X and Y directions. Alternatively or additionally, fabrication tray may be coupled to a conveyance unit (not shown) to enable relative movement between the printing unit and the object being printed. It should be realized that in other embodiments or for certain applications, both the fabrication tray and the printing unit may be stationary. Printing unit 120, tray 110 or both may move in the Z direction. For example, in some embodiments of the invention, printing unit 120 may be at a fixed location in the Z direction and fabrication tray or platform 110 may be capable of moving in the Z direction away from printing unit 120, e.g. gradually being lowered approximately a layer thickness distance from the printing unit or printing heads, to ensure that during printing the vertical distance between the printing heads and the top layer of the object to be printed remains constant.

In some embodiments, a printing file, bitmap or other collection of print data may be prepared and/or provided and/or programmed, for example, by a computing platform connected to 3D printer system 100 or by controller 180. The printing file may be used to determine, for example, the order and configuration of deposition of building materials via, for example, movement of and activation and/or non-activation of one or more nozzles 123 of printing head(s) 122a-c, according to a bitmap of each layer of the 3D object to be built.

Controller 180 may be suitably coupled and/or connected to various components of system 100, such as printing unit 120, printing heads 122a-c, material supply system 140, leveling unit 160 and others. For example, controller 120 may control valves, pumps, switches, compression or inflation devices, positioning units, dispensing units, leveling devices, curing devices, or any other system components.

Controller 180 may be implemented using any suitable combination of hardware and/or software. Controller 180 may include, for example, a processor 182, a memory unit 184, software code 186 and input/output interface 188. Other configurations may be used for a controller or control unit. Control functionality may be spread across units, and not all control functionality may be within system 100.

Controller 180 may be included within, or may include, a computing device such as a personal computer, a desktop computer, a mobile computer, a laptop computer, a server computer, or workstation (and thus part or all of the functionality of controller 182 may be external to 3D printer system 100). Controller 180 may be of other configurations, and may include other suitable components. For example, a separate unit, such as a personal computer or workstation, or a processing unit within a supply source such as a cartridge may provide some control or data storage capability. Processor 182 may include conventional devices, such as a Central Processing Unit (CPU), a microprocessor, a "computer on a chip", a micro controller, etc. Memory 184 may include conventional devices such as Random Access Memory (RAM), Read-Only Memory (ROM), or other storage devices, and may include mass storage, such as a CD-ROM or a hard disk.

Controller 180 may utilize computer object data (COD) representing an object and a support construction, if needed. The data may include bitmaps of layers that may include positions of various building materials including modeling material, support material and reusable material. For example, controller s computer aided design (CAD) data in Stereo Lithography (STL) format. Other data types or formats may be used. In some embodiments, controller 180 may include a CAD system. The CAD Controller 180 may convert such data to instructions for the various units within 3D printer system 100 to print a 3D object. Controller 180 may include non-transitory computer-storage medium having stored thereon instructions for printing unit 120 to print according to the bitmaps. Controller 180 may be located inside or outside the printing apparatus. Controller 180 may be located outside of printing system 100 and may communicate with printing system 100, for example, over a wire and/or using wireless communications. In alternate embodiments, controller 180 may be partially external to system 100. For example, an external control or processing unit (e.g., a personal computer, workstation, computing platform, or other processing device) may provide some or all of the printing system control capability.

Figure 2:
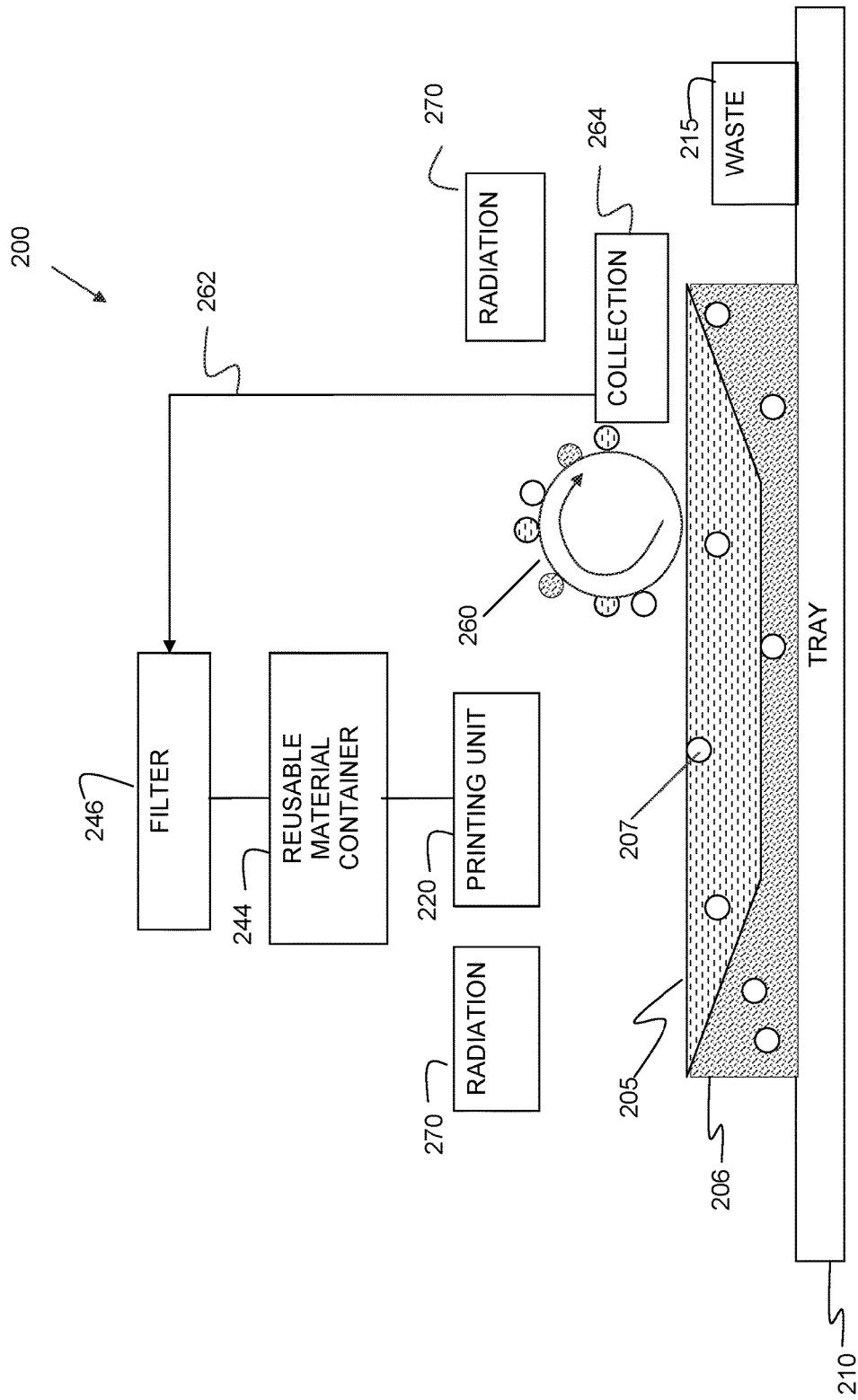
FIG. 2 is a schematic illustration of an exemplary printing system and printing process according to embodiments of the invention.

Reference is now made to FIG. 2, which is a schematic illustration of an exemplary printing process according to embodiments of the invention. An exemplary system 200 may include a fabrication tray 210, a printing unit 220, two radiation sources 270 and a leveling device or planarizer, for example in the form of a roller 260. Although, two radiation sources are illustrated in FIG. 2, embodiments of the invention are not limited in this respect and any other number of radiation sources is likewise applicable.

As shown in FIG. 2, the surplus material may be a mixture of modeling material, support material, and reused material. A three dimensional object 205 supported by a support construction 206 is being formed on a fabrication tray 210 by depositing in layers building materials from printing unit 220 and curing the deposited layer by radiation sources 270. Three-dimensional object 205 may include predominantly at least one modeling material but may also include support material. The support construction 206 may include predominantly at least one support material and may further include in certain locations within the support construction a modeling material to provide desired mechanical characteristics. Leveling device 260 may collect surplus material from the liquid layer prior to curing. The surplus material may be collected by a bath 264 and conveyed to filter 246 via tube 262. Filtered liquid waste may then be conveyed to reusable material container 244. The filtered reusable material is delivered to the printing unit 220. Based on the layer structure, the surplus material collected by the leveling device may include modeling material, support material, reused material or any combination thereof.

The reusable material may be used for building both the 3D object and the support construction. Accordingly, both object 205 and support construction 206 may include pre-designed areas of reused or recycled materials 207. The locations and shape of these areas are chosen to match the desired characteristics of the 3D object and support structure. For example, the thermo-mechanical properties desired for the 3D objects may impose some limitation on the amount of reused waste material that can be re-used as a building material. According to some embodiments, the reused material may be used within bulky areas of the support construction. The reused material may be deposited as non continuous relatively small phases within a continuous bulky phase. Alternatively, the used material may be scattered within the continuous phase.

According to some embodiments, in order to dispose of excess uncured waste material that cannot be used for recycling, the 3D object may be formed concurrently with a waste block 215. According to other embodiments waste block 215 may be formed separately and non-concurrently with printing 3D object 205. Like layers of the 3D object, waste block 215 layers are cured thus rendering the material of waste block 215 easily and safely disposable.

Figure 3:
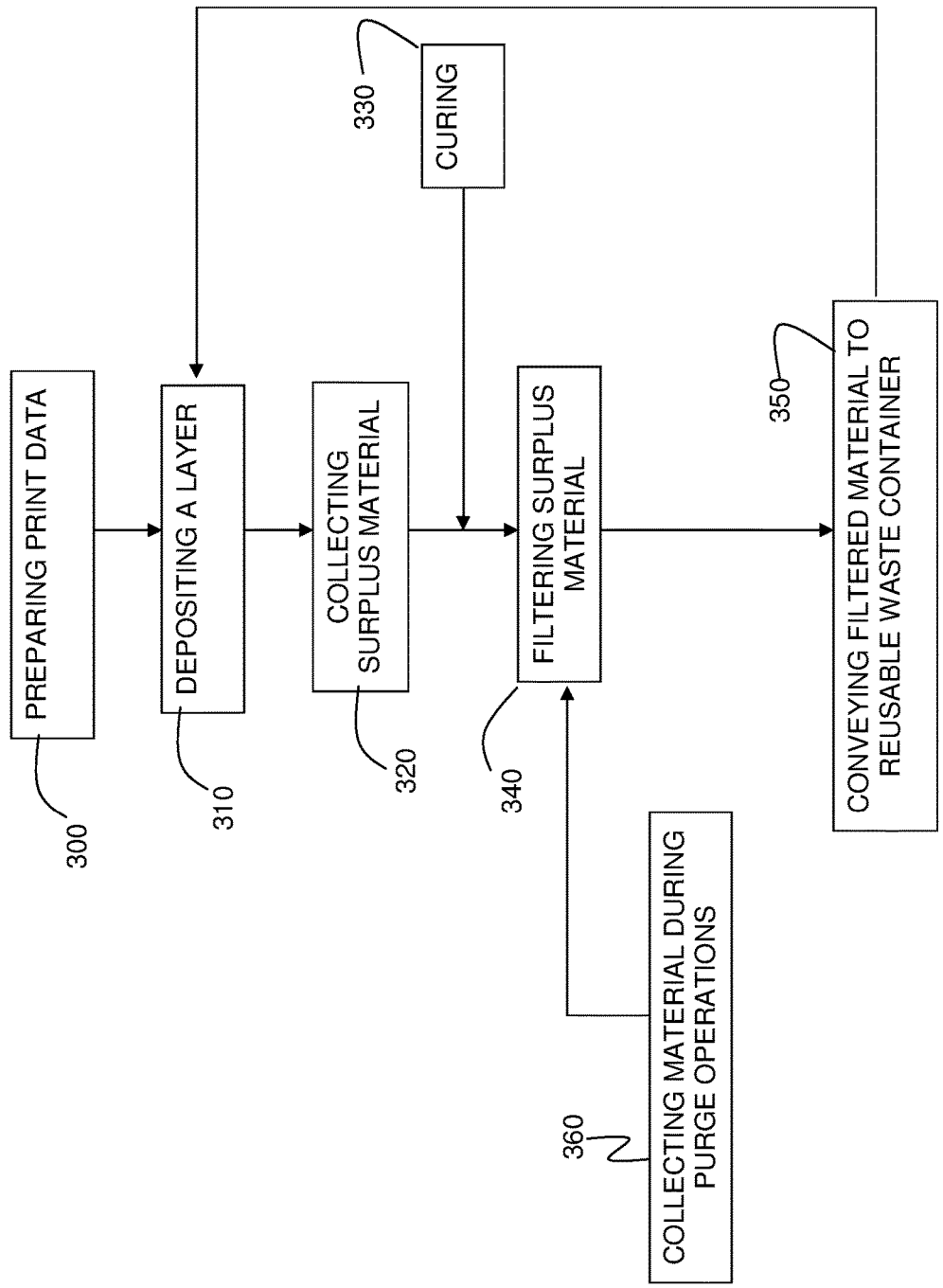
FIG. 3 is a flowchart diagram of a method of printing 3D objects according to embodiments of the invention.

Reference is now made to FIG. 3, which is a flowchart diagram of a method of printing 3D objects according to embodiments of the invention. According to embodiments of the invention, print data may be prepared for depositing building material, support material and recycled or reusable material in layers to form a three-dimensional object with its support construction and optionally a waste block for safe disposal (box 300). Then, for each layer, jetting commands are sent to one or more printing heads based on the print data, the suitable materials are delivered to the printing heads and one or more materials may be deposited to form a liquid or semi liquid layer on the fabrication tray or on previously formed layers (box 310). Then, a leveling device may collect surplus material from the layer (box 320). The layer may include two separate portions, a first portion associated with the 3D object and/or its support construction and a separate portion associated with a waste block. In some embodiments, only the portion associated with the 3D object may be planarized by the leveling device. Next, both portions of the layer (if existing) may be cured by radiation (box 330) and the collected surplus material may be conveyed to a filter (box 340) to remove any polymerized portions prior to using the filtered waste material as a building material within subsequent layers. Filtered reusable waste is collected and conveyed (box 350) back to the system for deposition of new layers (box 310). As shown by box 360, the printing unit may be moved to a service or maintenance area. The maintenance may include a purging operation, during which the purged building materials may be collected and conveyed to a filter (box 340) to remove any polymerized elements, before being collected and conveyed to the system (box 350) for deposition within new layers (box 310).

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Some embodiments of the present invention may be implemented in software for execution by a processor-based system. For example, embodiments of the invention may be implemented in code and may be stored on a computer-storage medium having stored thereon instructions which can be used to program a system to perform the instructions. The computer-storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A printing system for forming three-dimensional objects, layer by layer, the system comprising:
    a first inkjet printing head to dispense modeling material from a modeling material container;
    a second inkjet printing head to dispense support material from a support material container;
    a reusable waste material container;
    a third inkjet printing head communicating with the reusable waste material container to dispense reusable material conveyed from the reusable waste material container, wherein said reusable material comprises materials previously discharged from at least one of the first and second inkjet printing heads; and
    a leveling unit that removes surplus material from previously deposited layers of dispensed material, a bath wherein the surplus material is collected, a filter retaining solid particles through which liquid reusable waste material passes, and a tube conveying the reusable waste material to the reusable waste material container.

2. The printing system of claim 1, further comprising:
    a purge unit for purging inkjet printing heads and collecting purge material during maintenance; and
    a second tube that delivers the material from said purge unit to the reusable waste material container.

3. The printing system of claim 2, comprising:
    a filter located between the purge unit and the reusable waste material container.

4. The printing system of claim 1, wherein:
    a filter is coupled to the leveling unit, and wherein surplus material collected by the leveling unit is provided to the reusable waste material container via the filter.

5. The printing system of claim 1, wherein comprising:
    a filter is located between the reusable waste material container and the inkjet printing heads.

6. The printing system of claim 1, wherein the leveling unit comprises a roller.

7. The printing system of claim 1, comprising a curing unit.

8. The printing system of claim 7, wherein the curing unit comprises a radiation light source.

9. The printing system of claim 1, further comprising:
    a controller to control the formation of the three dimensional object by dispensing modeling material, support material and reusable waste material in layers from different inkjet printing heads.

* * * * *